(12) United States Patent
Hines

(10) Patent No.: US 7,788,924 B2
(45) Date of Patent: Sep. 7, 2010

(54) SYSTEM AND METHOD FOR IN-LINE GEOTHERMAL AND HYDROELECTRIC GENERATION

(76) Inventor: Garold Paul Hines, P.O. Box 1264, Fernley, NV (US) 89408

( * ) Notice: Subject to any disclaimer, the term of this patent is extended or adjusted under 35 U.S.C. 154(b) by 1038 days.

(21) Appl. No.: 11/305,832

(22) Filed: Dec. 15, 2005

(65) Prior Publication Data

US 2007/0137202 A1 Jun. 21, 2007

Related U.S. Application Data

(60) Provisional application No. 60/637,838, filed on Dec. 22, 2004, now abandoned, provisional application No. 60/666,604, filed on Mar. 31, 2005.

(51) Int. Cl.
*F03G 7/00* (2006.01)
(52) U.S. Cl. .................................. 60/641.2
(58) Field of Classification Search ...... 60/641.2–641.5
See application file for complete search history.

(56) References Cited

U.S. PATENT DOCUMENTS

| | | | | |
|---|---|---|---|---|
| 3,757,516 A | * | 9/1973 | McCabe | 60/641.2 |
| 4,054,176 A | | 10/1977 | Van Huisen | |
| 4,577,679 A | * | 3/1986 | Hibshman | 165/45 |
| 5,220,792 A | | 6/1993 | Doron et al. | |
| 5,911,684 A | * | 6/1999 | Shnell | 60/641.2 |
| 5,924,287 A | | 7/1999 | Best | |
| 6,216,463 B1 | | 4/2001 | Stewart | |

OTHER PUBLICATIONS

PCT/US05/46929 International Search Report dated May 12, 2006, pp. 1-3.
O.K. Buros, "Multi-effect Distillation", p. 9 in the ABC's of Desalting, International Desalination Association, Topsfield, Massachusetts, USA, circa 2000, 2nd edition, 32 pages.
O.K. Buros et al., the U.S.A.I.D. Desalination Manual, published by the International Development Cooperation Agency, Office of Engineering and prepared by CH2M Hill International Corporation, August 1980, relevant section Chapter 3 and specifically Figure 3-8, on p. 3-70; Figure 3-10 on pp. 3-72 and 3-73; Figure 3-12 on p. 7-75; Figure 14 on p. 3-77; Figure 3-15 on pp. 3-78 and 3-79; Figure 3-17 on pp. 3-81; pp. 3-5 - 3-11 and p. 3-63.
WorldCat record from OCLC indicating that the U.S.A.I.D. Desalination Manual was originally published in 1980 and also appeared in print under the title: Desalination manual IDEA 1981.

* cited by examiner

*Primary Examiner*—Hoang M Nguyen
(74) *Attorney, Agent, or Firm*—Lewis and Roca LLP

(57) ABSTRACT

A stack system and method for in-line geothermal and hydroelectric generation from recovered natural gas-fired water/steam process waste heat. The stack system and method is a new way of reusing natural gas fired water/steam process waste heat to make more electricity from the same Btu inputs. The stack system and method uses warm industrial demineralized water from various sources, a micro-managed combined stack flue system and specific terrain to ring out every bit of energy possible from traditional, heretofore, acceptable wastes. The stack uses two marginal waste heat sources to make one significant heat source for additional fossil fuel-free generation. This stack is unique in that it incorporates tandem, geothermal and hydroelectric generators. The stack can be applied to closed-loop (Power Stack) and open-loop (Desalination Stack) processes.

15 Claims, 8 Drawing Sheets

FIG. 4A                    FIG. 4B

SYSTEM AND METHOD FOR IN-LINE GEOTHERMAL AND HYDROELECTRIC GENERATION

CROSS REFERENCE TO RELATED APPLICATIONS

This application claims the benefits of U.S. Provisional Application Ser. No. 60/637,838, filed Dec. 22, 2004 and to U.S. Provisional Application Ser. No. 60/666,604, filed Mar. 31, 2005.

BACKGROUND

Field of the Invention

The present invention relates to geothermal and hydroelectric generation. More particularly, the present invention relates to in-line geothermal and hydroelectric generation from recovered natural gas-fired industrial water/steam process waste heat.

SUMMARY OF THE INVENTION

This patent discloses and claims a useful, novel, and unobvious stack system and method for in-line geothermal and hydroelectric generation from recovered natural gas-fired water/steam process waste heat.

The stack system and method of the present invention is a new way of reusing natural gas fired water/steam process waste heat to make more electricity from the same Btu inputs. The stack system and method uses warm industrial demineralized water from various sources, a micro-managed combined stack flue system and specific terrain to ring out every bit of energy possible from traditional, heretofore, acceptable wastes. The stack system and method uses two marginal waste heat sources to make one significant heat source for additional fossil fuel-free generation. This stack is unique in that it incorporates tandem, geothermal and hydroelectric generators. This stack system and method can be applied to closed-loop (Power Stack) and open-loop (Desalination Stack) processes.

Power Stack

A principal object of the present invention is to provide a power plant waste heat conversion process and apparatus called Power Stack that will overcome the deficiencies of the prior art devices.

An object of the present invention is to provide a natural gas depressurized cooling heat exchanger device that will properly control Demineralized Circulating Water (DCW) to an 80° F. constant temperature. Natural gas depressurization will cool post-turbine steam in the steam cycle during the hottest summer months and reduction of natural gas depressurization cooling will advantageously heat post-turbine steam in the steam cycle during the coldest winter months.

Another object of the present invention is to provide a natural gas depressurized cooling of DCW that will eliminate any type of internal and/or external cooling towers and thus eliminate any and all cooling tower evaporation.

Another object of the present invention is to provide the only generation by two renewable generators (geothermal and hydroelectric) in a continuous DCW closed loop in tandem with traditional steam plants that are both free from additional fossil fuel input.

Another object of the present invention is to provide a greatly improved topographical elevation change of water state process that significantly supersedes any traditional uphill off-peak pumping costs. A cheaper, non-terrain utilization version can include placing Power Stack atop an existing steam unit or aside an existing unit's stack.

Another object of the present invention is to provide a Power Stack apparatus having an infrastructure that does not contain any pumps or fans greater than 480 volts.

Another object of the present invention is to provide a Power Stack process and apparatus that routinely allows flexible generation from geothermal units. These normally static 'green' generators can easily produce peak load with duct burner input.

Another object of the present invention is to provide a Power Stack process that eliminates station service losses from traditional winter cooling tower maintenance against icing by running a second DCW pump and/or reversing fans. Furthermore, Power Stack eliminates traditional over-generation during winter to keep DCW warm enough not to sub-cool the condenser, which endangers turbine back-end blading.

Another object of the present invention is to provide a Power Stack process that extends single DCW pump use by high-head feeding siphon effect and from cooler DCW-in temperatures for better backpressure. It also reduces induction fan use due to negative pressure generated at the bottom intake of the tall Power Stack flue.

Another object of the present invention is to provide a method for nuclear energy to be generated in rural areas if supported by enough depressurized natural gas flow for DCW cooling, steep terrain and a few good wells. It is a drought-resistant and timely process.

Desalination Stack

A principal object of the present invention is to provide a more reliable, more efficient, less costly saltwater to potable water distillation process and post-process electric generation by apparatus called Desalination Stack that will overcome the deficiencies of the prior art devices.

Another object of the present invention is to provide a natural gas depressurized cooling heat exchanger device that will better control the distillation temperature environment within a desalination chamber for better vapor condensation rates. This heat exchanger with natural gas internal flow is called the step-down condenser. It replaces seawater-in on most traditional MED and MSF schemes.

Another object of the present invention is to provide a natural gas depressurized cooling heat exchanger device that will better develop vacuum within desalination chamber for lower brine evaporation temperatures. This heat exchanger with natural gas internal flow is called the step-down condenser. It replaces seawater-in and non-condensable ejectors on most traditional MED and MSF schemes.

Another object of the present invention is to provide natural gas fired exhaust heating that creates an externally heated seawater/brine heater, replacing traditional steam-in seawater/brine heaters. This flue gas brine heater eliminates traditional internal routing of seawater in through stages or effects. This reduces construction costs, removes seawater-in corrosion, aggressive cathodic protection problems, and increases reliability with fewer outages. Nothing hinders brine vapor access to the icy step-down condenser.

Another object of the present invention is to provide natural gas fired exhaust gasses to reboil freshwater-out for the production of electricity: 1) as it condenses back to water through the geothermal generator, and 2) after it condenses back to water through the hydroelectric generator.

Another object of the present invention is to provide optional steamless construction allowing simpler mechanical vacuum and non-condensable removal. As with steam style process, optional individual maximum brine heating coupled with maximum individual cooling/vacuum uses fewer chambers for full desalination.

Another object of the present invention is to provide double boiling of freshwater-out/DCW for ultimately pure potable water. Though unnecessary for drinking water, it is good for equipment anti-scale chemistry.

Another object of the present invention is to provide standalone full DCW capability. Desalination Stack can function without any combustion turbines on-line solely using individual auxiliary chamber burners and duct burners. More gas is routed through chambers than can be fired by individual auxiliary burners. This surplus is valved to the duct burner, contributing to overall flue heat. While uneconomical, the added step-down depressurized natural gas will condense even more brine vapor. Full capacity water production is therefore possible.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

The stack systems and methods of the present invention harness natural gas-fired industrial water/steam process waste heat. This heat is comprised of flue gas waste heat that boils previously waste heated pristine demineralized water from various sources. The resulting saturated steam is sent to a geothermal generator. It is then sent as water to a hydroelectric unit, and eventually cooled en route to its final destination.

Figure 1:
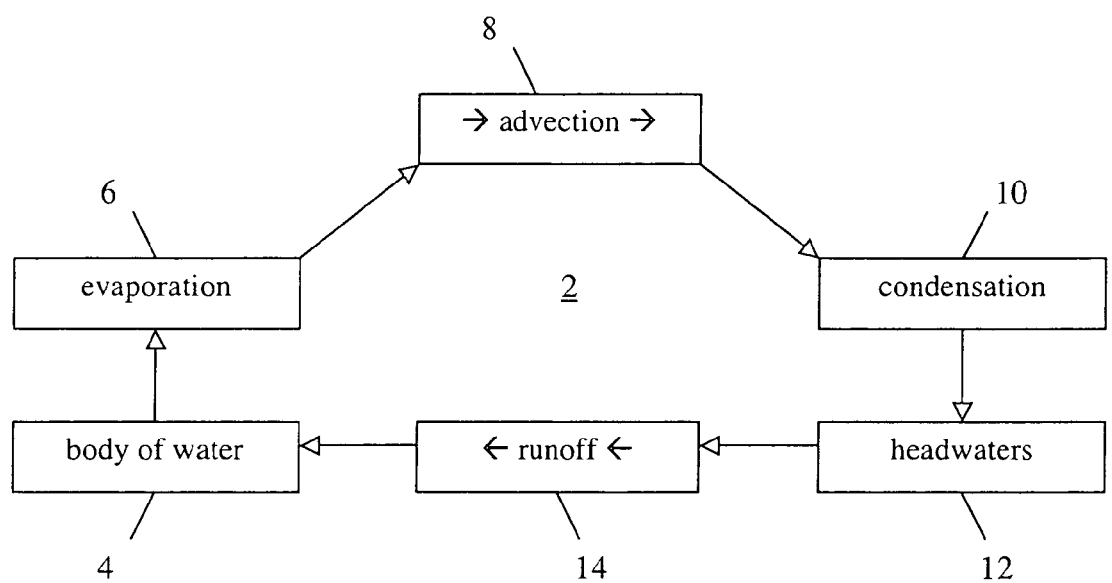
FIG. 1 is an exemplary embodiment of a hydrologic cycle.

FIG. 1 illustrates a hydrologic cycle 2. Hydrologic cycle 2 starts at lower left where a body of water 4 is heated up and evaporated 6 as moisture up into clouds. Clouds move horizontally clockwise, by advection 8, to the place where condensation 10 in the form of precipitation falls on headwaters 12. Runoff water 14 then flows back to the body of water 4.

Figure 2:
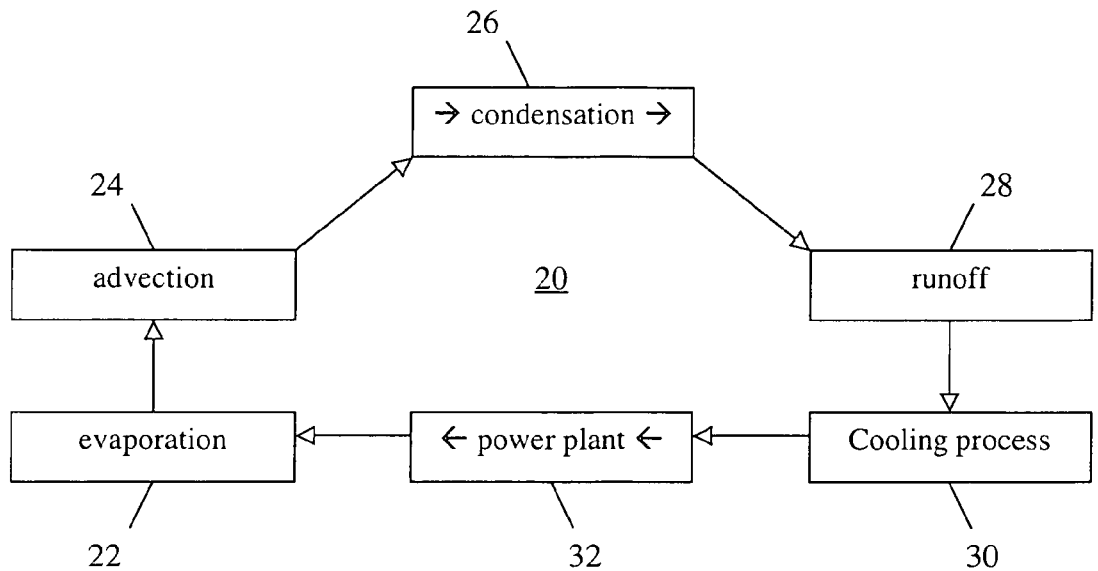
FIG. 2 is an exemplary embodiment of the general Power Stack process of the present invention.

FIG. 2 illustrates the general Power Stack process 20 of the present invention. The Power Stack system and method rotates the hydrologic cycle 2 ninety degrees counter-clockwise. Therefore, the Power Stack system and method evaporative process 22 rotates to the bottom left. Next, the Power Stack's left-hand side ascending vertical is distilled water advection 24 in saturated steam form. The top sector flow is condensation 26, due to taking heat out of the saturated steam by a geothermal generator, as will be discussed below. The right-hand side descending vertical is high-head hydroelectric generation runoff 28. The water goes through a cooling process 30, and then flows though a power plant 32 back to evaporation point 22.

As seen in FIG. 2, the general Power Stack process 20 is a closed loop process. This closed loop begins by modifying steam cycle main condenser cooling water. Normally, raw cooling water (from a river or body of water) picks up Btus from post-turbine boiler steam in a condenser. Raw water then flows to a cooling tower where evaporation gives up the Btus and thousands of gallons of water per minute. Cooled raw water is pumped back to the condenser. Instead, the Power Stack of the present invention uses pristine demineralized water for steam cycle cooling. The Power Stack's heat exchanger boils the very warm demineralized water leaving the condenser with steamer and combustion turbine flue gas waste heat. Vaporous saturated steam fills a vertical pipe which leads to an elevated geothermal generator. Elevated locations can include a dozed hill, nearby natural terrain or the top of the steamer itself. Saturated steam superheats geothermal generator Freon to produce electricity, and in the process, turns into about 120° F. DCW.

These one-to-one water to steam to water phase changes are the first factor for lifting saturated steam uphill. The warm water then flows down to a hydroelectric unit back at base level. The siphon effect is the second factor for lifting saturated steam uphill. Siphon also pulls a negative on the entire evaporation process to lower the boiling point. The third factor is temperature gradient itself.

About 30-40° F. is preferably removed before closed-loop, pristine DCW reaches the power plant condenser.

Figure 3:
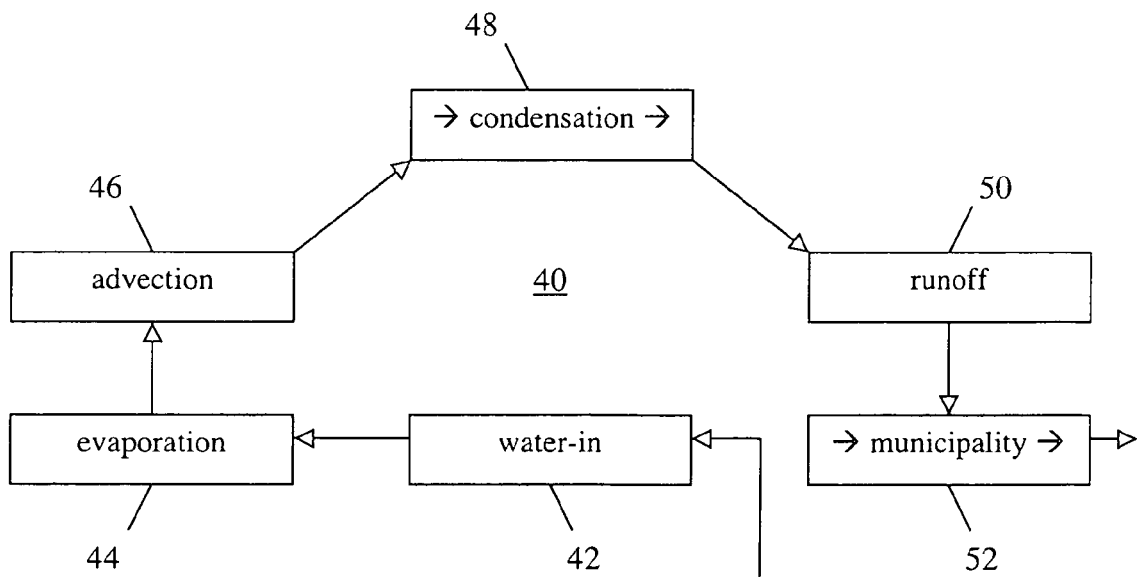
FIG. 3 is an exemplary embodiment of the general Desalination Stack process of the present invention.

FIG. 3 illustrates the general Desalination Stack process 40 of the present invention. Just like the general Power Stack process 20 of the present invention, the general Desalination Stack's system and method rotates the hydrologic cycle 2 ninety degrees counter-clockwise. Water is introduced into the process at step 42. The water is evaporated, as the desalination stack's evaporative process 44 has been rotated to the bottom left. Next, the Desalination Stack's left-hand side ascending vertical is distilled water advection 46 in saturated steam form. The top sector flow is condensation 48, due to taking heat out of the saturated steam by a geothermal generator, as will be discussed below. The right-hand side descending vertical is high-head hydroelectric generation runoff 50. Desalination stack process 40 is different from Power Stack process 20 in that it is an open loop process. This open loop distinction is different from Power Stack's closed loop in that runoff 50 flows away from its evaporative starting point 44 and toward municipal consumption 52.

Open loop thermal desalination conveniently produces its own pristine demineralized water. Seawater-in is heated to the point of vaporization, which is customarily about 230° F. Natural gas cooling produces more condensate from vapor and the net lower vacuum attained reduces boiling temperatures. Yet, this anti-scale perk still yields very warm freshwater-out. Instead of traditionally cooling the demineralized freshwater and sending it directly to the public, the Desalination Stack of the present invention makes that hot water perform more work. It is re-boiled by associated combustion turbine flue gas waste heat, sent up to the geothermal generator, drawn down to the hydroelectric unit, and cooled by thermal oriented businesses. Only then is it remineralized, traditionally cooled and pumped to municipal distributions. In the long term, this desalination stack may become cheaper than reverse osmosis.

The Power Stack and Desalination Stack of the present invention provide free, low tech geothermal and hydroelectric green generation without additional fans or pumps, assures year round 80° F. condenser cooling water (important to power plant operation) and, as a benefit to local communities with thirsty people, there is no water lost to evaporation.

Figure 4:
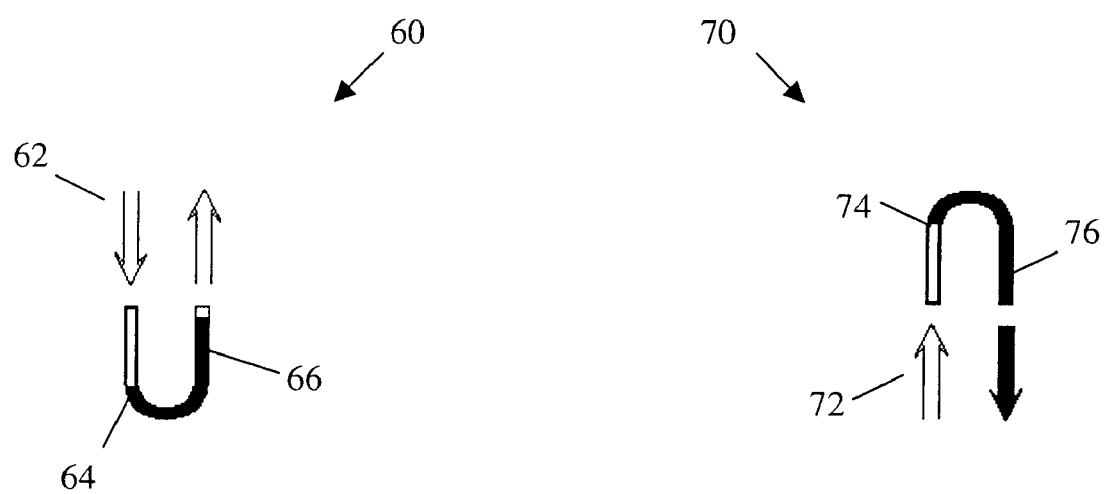
FIG. 4A is an exemplary embodiment of a normal manometer.
FIG. 4B is an exemplary embodiment of a manometer associated with the power stack and the Desalination Stack of the present invention.

The Power Stack and Desalination Stack DCW system is like an upside-down manometer. As seen in FIG. 4A, a normal manometer 60 includes a positive pressure 62 exerted on one leg 64, pushing down on the integral column of water leg 66 and resisting against the pull of gravity. Where the line of liquid stops is where the pressure is measured.

The manometer 70 associated with the Power Stack and the Desalination Stack of the present invention is an upside-down manometer. It includes thermal gradient and pressure gradient 72 exerted on one leg pulled up on by the interconnected downward column of water leg 76, assisted with the pull of gravity. Where the line of liquid starts at 74 is the siphon pressure of water itself, continually condensed at or near the zenith of potential energy. The Stacks' second leg 76, the downward water column, possesses enough kinetic energy to siphon a full wet column of water upwards by itself, yet has only vapor to pull. The Stacks' inverted manometer 70 sufficiently lifts the positive moment of saturated steam input energy by its prevailing negative moment of draining condensation output energy.

Figure 5:
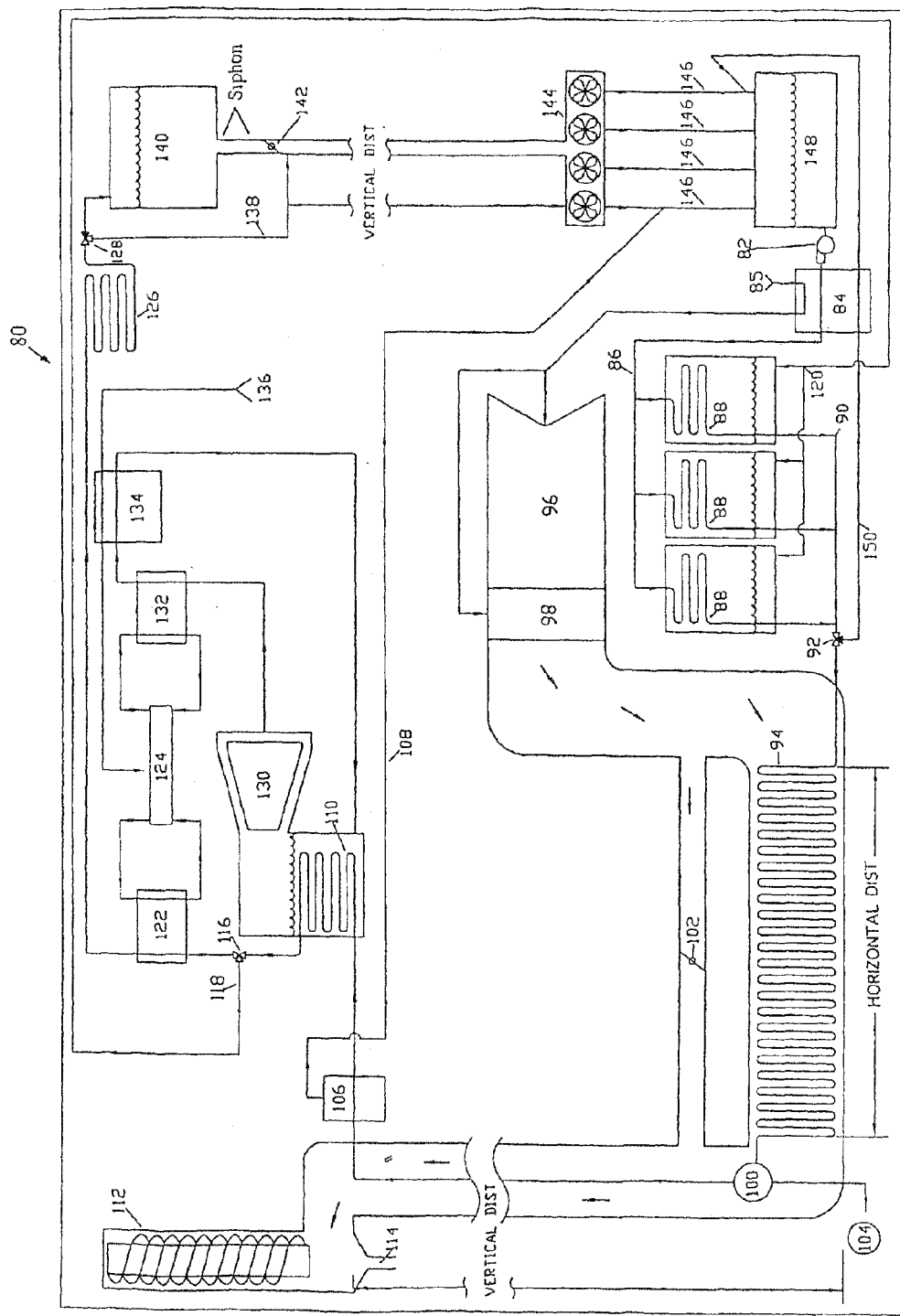
FIG. 5 is an exemplary embodiment of a power stack system according to the present invention.

FIG. 5 is an exemplary embodiment of a Power Stack system 80 according to the present invention. System 80 comprises DCW pump 82, which supplies DCW throughout the system. DCW pump 82 is coupled with natural gas heat exchanger 84, which cools DCW. Heat exchanger 84 is coupled to DCW-in header 86, which routes DCW through DCW steam cycle heat exchangers 88, to DCW-out header 90. DCW-out header 90 is coupled to stack heat exchanger 94 through DCW-out valve 92. Valve 92 is normally open to heat exchanger 94, allowing DCW to be vaporized by cumulative flue gas heat from thermal flue source or sources 96. The flue gas temperature may be increased by duct burner 98. DCW from DCW-out header 90 is heated by flue gas heat from sources 96 and/or duct burner 98. Excess flue gas volume may bypass heat exchanger 94 through bypass 102. Natural gas supply 85 provides cooling in heat exchanger 84 and combustion Btus for thermal processes 96 and 98.

DCW-out will become saturated steam by the time it reaches drum 100. Water solids from drum 100 are removed by blowdown pump 104. Saturated DCW proceeds upwards through de-aerator 106, where non-condensables are removed by eductor 108. Flue gas flows to and through upper flue gas discharge 112. Liquified gas particulates are collected in waste drain 114. DCW saturated steam from deaerator 106 flows to Rankine cycle heat exchanger 110, where Freon picks up DCW-out steam Btus. Condensed DCW flows from latter stages of heat exchanger 110 to and through routing valve 116. A minor portion of DCW flows to and through line 118 to hotwell makeup header 120. The larger portion of DCW flows through larger thermal business heat exchanger 122, benefitting to thermal business site 124. Cooler DCW flows to optional ground loop cooling 126 to routing valve 128.

Heated by heat exchanger 110, superheated Freon flows through and turns geothermal turbine(s) 130. Spent Freon gas from geothermal turbine(s) 130 flows to and through smaller thermal business heat exchanger 132 and potable water heat exchanger 134. Potable water heat exchanger 134 component 136 flows to thermal business site 124. Liquefied Freon is returned to heat exchanger 110.

DCW from valve 128 becomes high head hydroelectric source 138. Routing valve 128 can also send DCW to dark start reserve tank 140. From hydroelectric source 138, DCW drops vertically to hydroelectric units 144. Hydroelectric throttle valve 142 enables additional flow from reserve tank 140 to and through hydroelectric units 144. Plume surge piping 146 from hydroelectric units 144 flows to plume surge tank 148. DCW non-condensables from deaerator 106 flow through eductor line 108 to plume surge piping 146. DCW may flow through DCW bypass 150 from routing valve 92, and through natural gas heat exchanger 84 to plume surge piping 146. DCW supply pump 82 takes suction from plume surge tank 148.

Geothermal turbine(s) 130 and hydroelectric units 144 each generate electricity from reheated DCW without additional Btus. The electricity is generated solely from power plant discharges from DCW-out header (thermal water source) 90 and thermal flue source(s) 96 that would normally be wasted to atmosphere.

Figure 6:
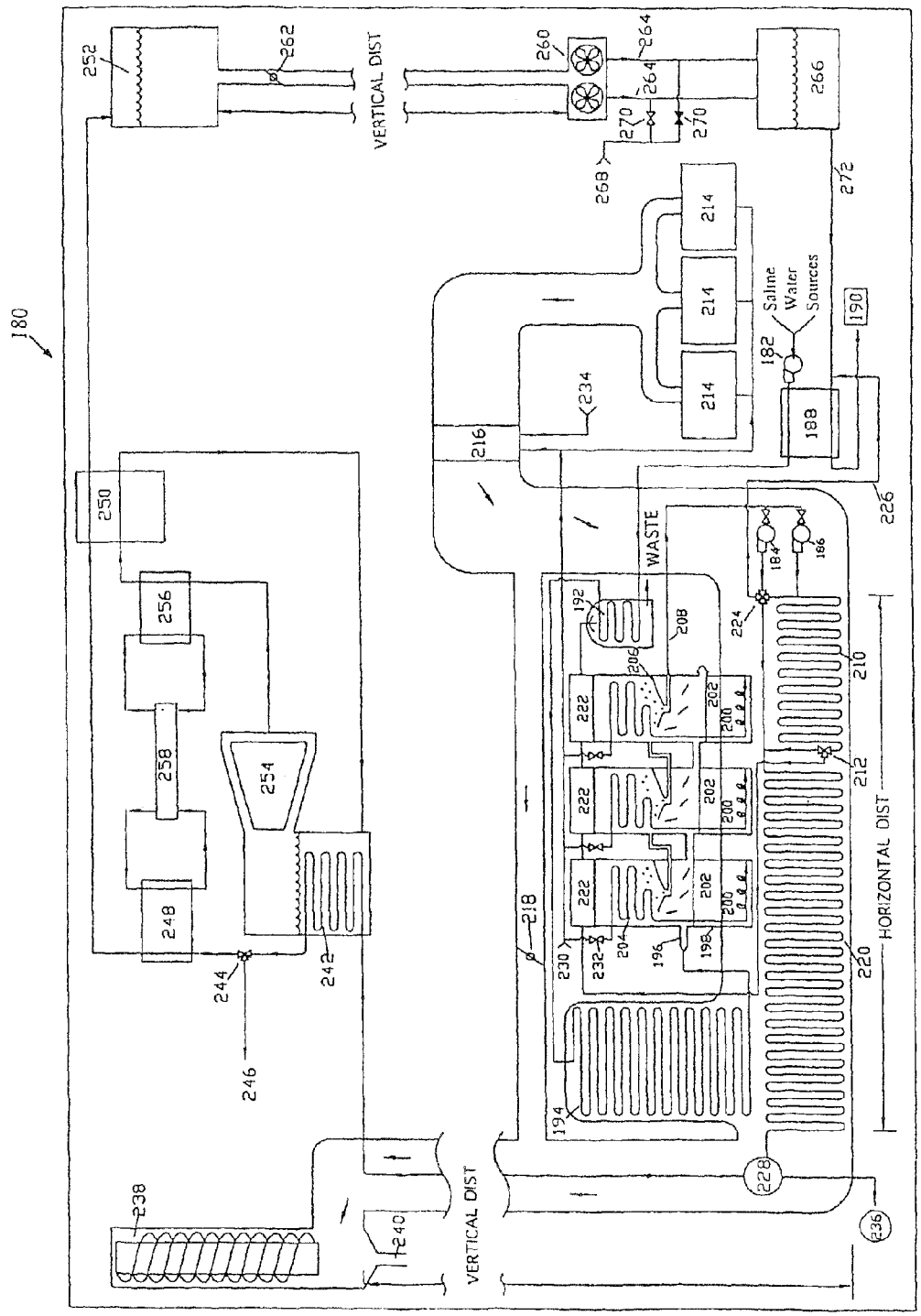
FIG. 6 is an exemplary embodiment of a Desalination Stack system according to the present invention.

FIG. 6 illustrates an exemplary embodiment of a Desalination Stack steam system 180 according to the present invention. Steam system 180 comprises seawater-in pump 182, which supplies seawater from saline water sources, such as the ocean, aquifers, and lakes, to freshwater-out/DCW header pumps: low-pressure pump 184 and high-pressure variable-speed pump 186. It is contemplated that seawater refers to saline water from any source.

Seawater-in is pumped through seawater/freshwater heat exchanger 188, where seawater-in cools freshwater that is directed to city/municipal water system 190. Seawater proceeds to final condenser (heat exchanger) 192, en route to seawater/brine heater 194. Seawater is injected from seawater/brine heater 194 into individual desalination process chamber(s) 198 through injection port 196. This hot seawater-in is further heated by auxiliary heater(s) 200. Brine vapor, represented by the arrows, escape from brine 202 into condensation, represented by the dots. This condensation is precipitated out by depressurized natural gas step-down condenser/heat exchanger(s) 204. This resultant condensation gravitates to V-shaped condensation collector(s) 206. Condensation collector(s) 206 cumulatively produce freshwater for freshwater-out/DCW header 208.

Pumps 184 and 186 take suction from header 208. High-pressure pump 186 supplies pressure to start up heat exchanger 210, which creates pressure that routing valve 212 controls. This pressure is created by DCW being boiled by flue gas Btus from combustion turbine(s) 214 and/or duct burner 216. Flue gas bypass 218 prevents overheating of heat exchanger 210 and desalination stack heat exchanger 220. High-pressure pump 186 can also send DCW to routing valve 224. Valve 212 sends DCW to heat exchanger 220 or to steam air ejector(s) 222. Steam from steam air ejector(s) 222 proceeds to the final condenser/heat exchanger 192, and is sent to final condenser waste.

Natural gas supply header 230 sends high-pressure natural gas to combustion turbine(s) 214 and to duct burner 216. Natural gas is sent through pressure reducing valve 232 into individual chambers 198. Within chambers 198, step-down heat exchanger 204 creates condensation (represented by dots), supplies natural gas to auxiliary heater(s) 200, and supplies stand-alone natural gas to duct burner 216 through stand-alone line 234.

Low-pressure pump 184 sends pressure to routing valve 224. Routing valve 224 sends low-pressure DCW to heat exchanger 220. Routing valve 224 can also send DCW to DCW bypass line 226.

DCW-out will become saturated steam by the time it reaches drum 228 from heat exchanger 220. Water solids from drum 228 are removed by blowdown pump 236. Flue gas flows to and through upper flue gas discharge 238. Liquified gas particulates are collected in waste drain 240. DCW saturated steam from drum 228 flows to Rankine cycle heat exchanger 242, where Freon picks up DCW-out steam Btus. Condensed DCW flows from latter stages of heat exchanger 242 to and through routing valve 244. A minor portion of DCW can flow through line 246 to an optional specialty business. The larger portion of DCW flows through larger thermal business heat exchanger 248, benefiting thermal business site 258. The resultant cooler DCW continues to flow through DCW heat exchanger 250 en route to high head hydroelectric supply tank 252.

Heated by heat exchanger 242, superheated Freon flows through and turns geothermal turbine(s) 254. Spent Freon gas from geothermal turbine(s) 254 flows to and through smaller thermal business heat exchanger 256, benefiting thermal business site 258, and continues to and through DCW heat exchanger 250. Resultant liquefied Freon is returned to heat exchanger 242.

From hydroelectric source tank 252, DCW drops vertically to hydroelectric units 260. Hydroelectric throttle valve 262 enables additional flow from tank 252 reserve to and through hydroelectric units 260. Plume surge piping 264 from hydroelectric units 260 flows to plume surge tank 266. Atmospheric aeration 268 is educted by and entrained in plume surge piping 264 through valves 270. Freshwater from plume surge tank 266 is forwarded through seawater-in/freshwater heat exchanger 188 via piping 272 to city/municipal water system 190. DCW bypass line 226 connects to piping 272 upstream of seawater-in/freshwater heat exchanger 188.

Geothermal turbine(s) 254 and hydroelectric units 260 each generate electricity from reheated DCW without additional Btu's. The electricity is generated solely from power plant discharges from DCW-out header (thermal water source) 208 and thermal flue source(s) 216 and 214 that would normally be wasted to atmosphere.

Figure 7:
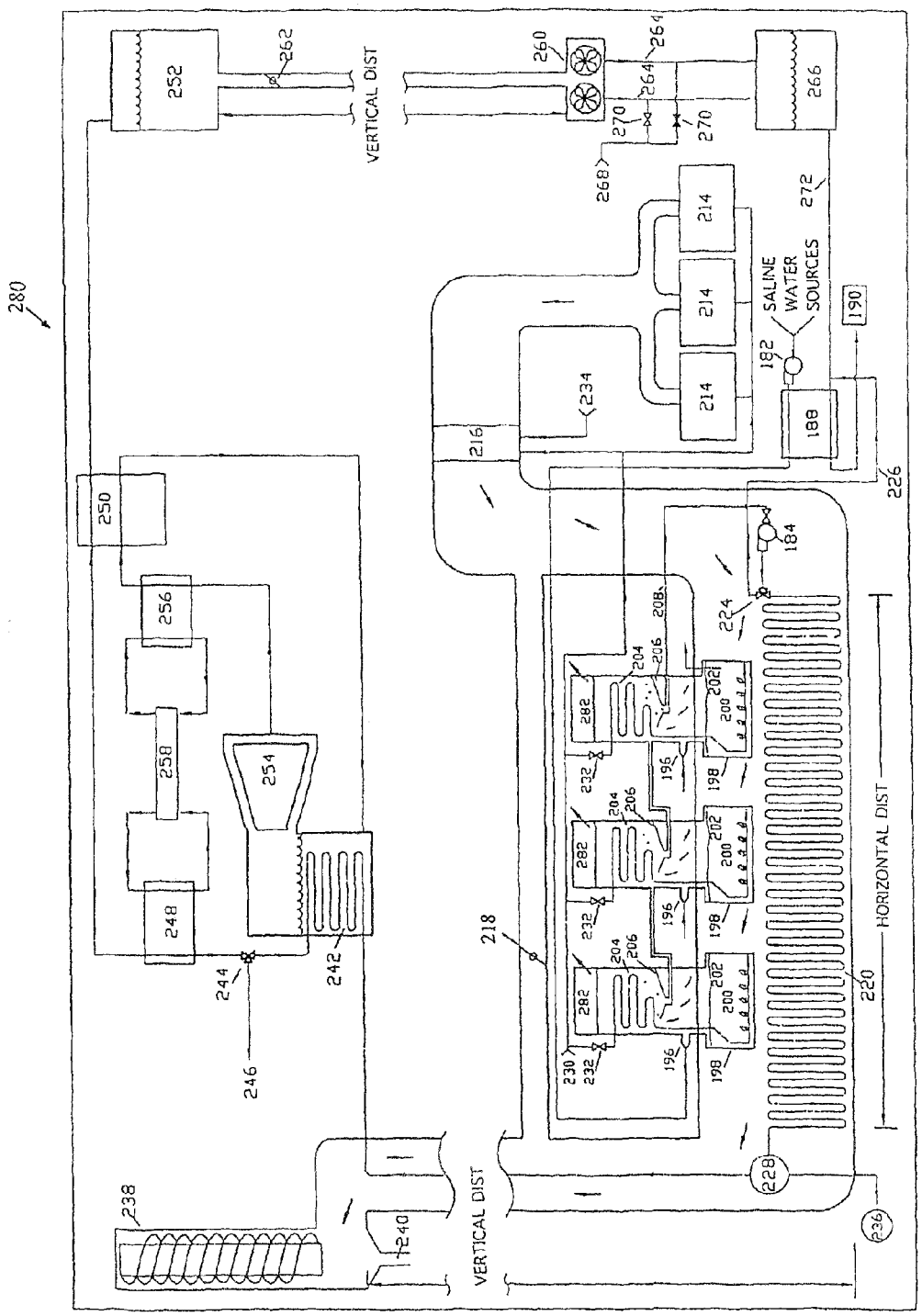
FIG. 7 is an alternative exemplary embodiment of a Desalination Stack system according to the present invention.

FIG. 7 illustrates an alternative exemplary embodiment of a Desalination Stack steamless system 280 according to the present invention. System 280 is similar to system 180, with like elements numbered alike.

Steamless system 280 comprises seawater-in pump 182, which supplies seawater from saline water sources, such as the ocean, aquifers, and lakes, to freshwater-out/DCW header low-pressure pump 184. It is contemplated that seawater refers to saline water from any source.

Seawater-in is pumped through seawater/freshwater heat exchanger 188, where seawater-in cools freshwater that is directed to city/municipal water system 190. Seawater is injected into individual desalination process chamber(s) 198 through injection port 196. This hot seawater-in is further heated by auxiliary heater(s) 200. Brine vapor, represented by the arrows, escape from brine 202 into condensation, represented by the dots. This condensation is precipitated out by depressurized natural gas step-down condenser/heat exchanger(s) 204. This resultant condensation gravitates to V-shaped condensation collector(s) 206. Condensation collector(s) 206 cumulatively produce freshwater for freshwater-out/DCW header 208.

Mechanical air ejectors 282 remove non-condensables from each individual chambers 198.

Natural gas supply header 230 sends high-pressure natural gas to combustion turbine(s) 214 and to duct burner 216. Natural gas is sent through pressure reducing valve 232 into individual chambers 198. Within chambers 198, step-down heat exchanger 204 creates condensation (represented by dots), supplies natural gas to auxiliary heater(s) 200, and supplies stand-alone natural gas to duct burner 216 through stand-alone line 234.

Pump 184 takes suction from header 208. Pump 184 supplies DCW to routing valve 224. Low-pressure pump 184 sends pressure to routing valve 224. Routing valve 224 sends low-pressure DCW to heat exchanger 220. Routing valve 224 can also send DCW to DCW bypass line 226.

DCW-out will become saturated steam by the time it reaches drum 228 from heat exchanger 220. Water solids from drum 228 are removed by blowdown pump 236. Flue gas flows to and through upper flue gas discharge 238. Liquefied gas particulates are collected in waste drain 240. DCW saturated steam from drum 228 flows to Rankine cycle heat exchanger 242, where Freon picks up DCW-out steam Btu's. Condensed DCW flows from latter stages of heat exchanger 242 to and through routing valve 244. A minor portion of DCW can flow through line 246 to an optional specialty business. The larger portion of DCW flows through larger thermal business heat exchanger 248, benefiting thermal business site 258. The resultant cooler DCW continues to flow through DCW heat exchanger 250 en route to high head hydroelectric supply tank 252.

Heated by heat exchanger 242, superheated Freon flows through and turns geothermal turbine(s) 254. Spent Freon gas from geothermal turbine(s) 254 flows to and through smaller thermal business heat exchanger 256, benefiting thermal business site 258, and continues to and through DCW heat exchanger 250. Resultant liquefied Freon is returned to heat exchanger 242.

From hydroelectric source tank 252, DCW drops vertically to hydroelectric units 260. Hydroelectric throttle valve 262 enables additional flow from tank 252 reserve to and through hydroelectric units 260. Plume surge piping 264 from hydroelectric units 260 flows to plume surge tank 266. Atmospheric aeration 268 is educted by and entrained in plume surge piping 264 through valves 270. Freshwater from plume surge tank 266 is forwarded through seawater-in/freshwater heat exchanger 188 via piping 272 to city/municipal water system 190. DCW bypass line 226 connects to piping 272 upstream of seawater-in/freshwater heat exchanger 188.

Geothermal turbine(s) 254 and hydroelectric units 260 each generate electricity from reheated DCW without additional Btu's. The electricity is generated solely from power plant discharges from DCW-out header (thermal water source) 208 and thermal flue source(s) 216 and 214 that would normally be wasted to atmosphere.

Figure 8:
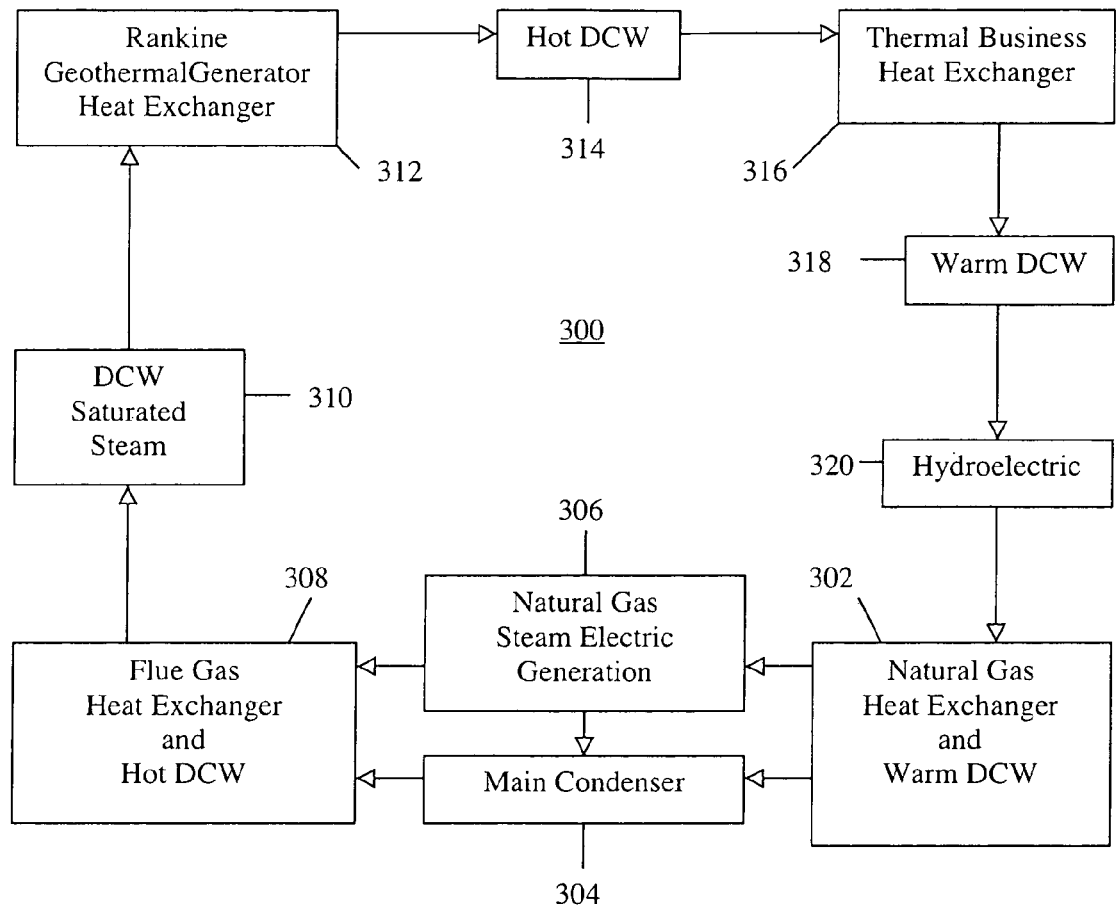
FIG. 8 is an exemplary embodiment of a Power Stack closed loop according to the present invention.

FIG. 8 illustrates an exemplary embodiment of a Power Stack closed loop 300 according to the present invention. At 302, the cycle begins with the DCW pump sending DCW to a natural gas heat exchanger, where warm DCW is cooled. Natural gas is directed to natural gas steam electric generation at 306, where it is combusted to create the steam electric generation, and the cooled DCW is sent to the main condenser at 304, where it picks up the natural gas Btu's from 306 after steam turbine utilization. Flue gas waste heat and DCW waste heat combine at flue gas heat exchanger at 308 and heat DCW into DCW saturated steam at 310. DCW saturated steam proceeds upwards, following diminished pressure to Rankine geothermal generator heat exchanger at 312. That heat exchange produces electrical energy and sends resultant hot DCW at 314 to the thermal business heat exchanger at 316.

Thermal business heat exchanger 316 utilizes hot DCW from 314 for the advantage of thermal oriented businesses. Warm DCW is then gravitationally pulled at 318 to hydroelectric units at 320, where the second generation of electricity occurs without the necessity of additional Btu's. Hydroelectric plume flow is directed back to starting point of 302.

Figure 9:
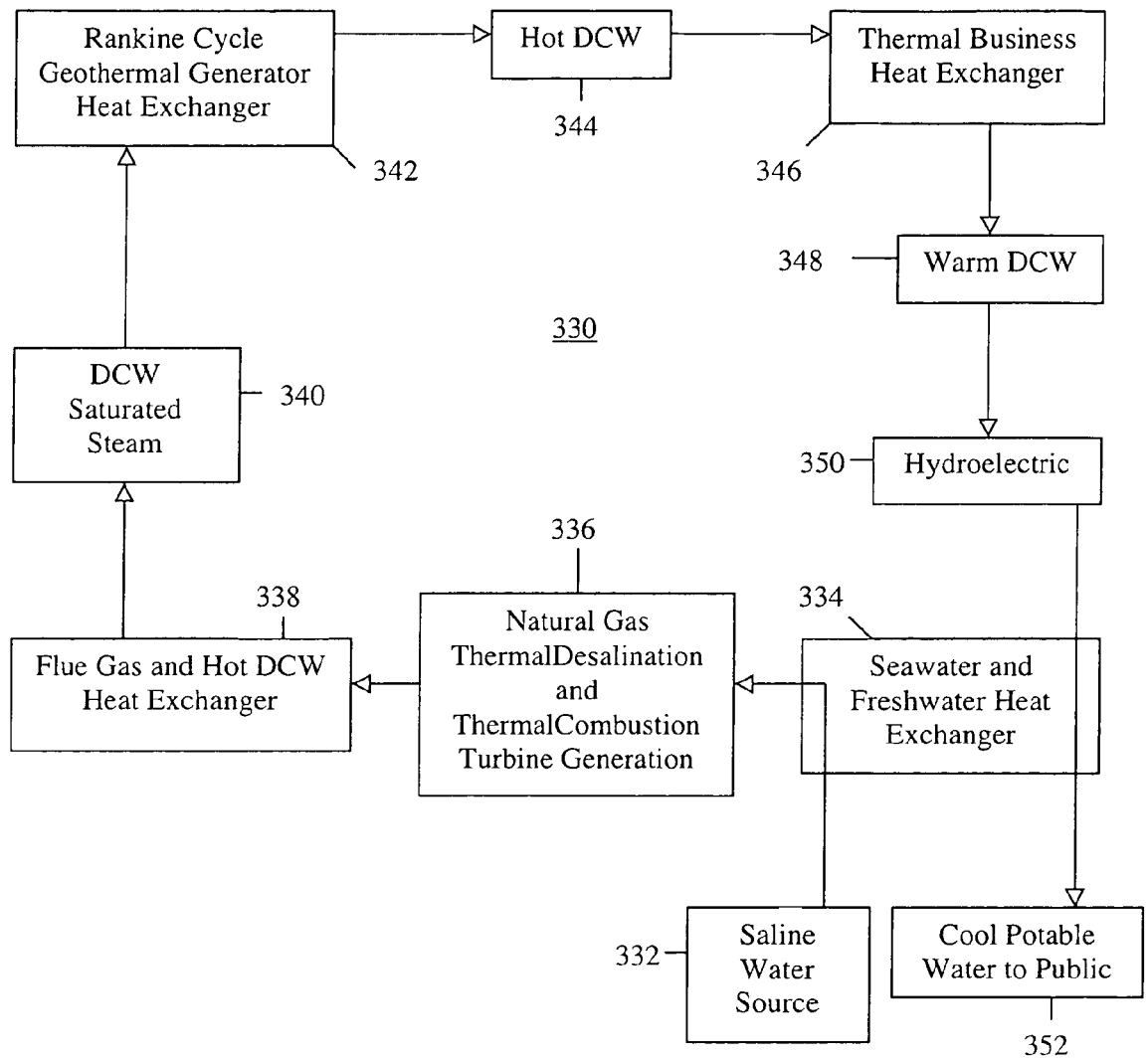
FIG. 9 is an exemplary embodiment of a Desalination Stack open loop of the present invention.

FIG. 9 illustrates an exemplary embodiment of a Desalination Stack open loop 330 of the present invention. At 332, the open loop begins with saline water being pumped at 332 through the seawater and freshwater heat exchanger at 334, Here, it picks up Btu's from freshwater coming into heat exchanger at 334 and contributes those Btu's to natural gas thermal desalination and thermal combustion turbine generation process at 336. Step 336 creates by-product waste heat in the form of flue gas and hot DCW, which are combined at heat exchanger 338. DCW saturated steam proceeds upwards at 340, following diminished pressure to Rankine geothermal generator heat exchanger at 342. That heat exchange produces electrical energy and sends resultant hot DCW at 344 to the thermal business heat exchanger at 346. Thermal business heat exchanger 346 utilizes hot DCW from 344 for the advantage of thermal oriented businesses. Warm DCW is then gravitationally pulled at 348 to hydroelectric units at 350, where the second generation of electricity occurs without the necessity of additional Btu's. Hydroelectric plume flow is directed through the seawater and freshwater heat exchanger at 334. Btu's are given up to the saline water 332 entering heat exchanger 334 en route to step 336. Cooler potable water is directed to public potable water systems at 352.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention.

What is claimed is:

1. A method for reusing natural gas waste heat to produce electricity without additional BTU inputs, the method comprising:
   providing a systematic closed loop for circulating demineralized circulating water (DCW) in a consistent direction around said loop, said loop comprising a DCW pump, a natural gas heat exchanger fluidly coupled in-line to said DCW pump, a steam cycle heat exchanger fluidly coupled in-line to said natural gas heat exchanger, a flue gas heat exchanger fluidly coupled in-line to said steam cycle heat exchanger, a geothermal turbine and geothermal heat exchanger fluidly coupled in-line to said flue gas heat exchanger, a hydroelectric unit fluidly coupled in-line in between said geothermal turbine and said DCW pump;
   said DCW flowing from said DCW pump to said natural gas heat exchanger, wherein said natural gas heat exchanger cools said DCW;
   said cooled DCW flowing through said steam cycle heat exchanger and to said flue gas heat exchanger, wherein said cooled DCW is heated into DCW saturated steam, contributing heat to said DCW;
   said DCW saturated steam flowing to said geothermal turbine and heat exchanger, wherein said geothermal heat exchanger condenses said DCW saturated steam and heats a refrigerant, causing said heated refrigerant to flow through said geothermal turbine and generate electricity;
   said condensed DCW flowing to said hydroelectric unit and generating electricity; and
   said DCW flowing from said hydroelectric unit back to said DCW pump,
   wherein the geothermal generation and the hydroelectric generation are powered by waste heat from flue gas and waste heat from said steam cycle heat exchanger into said DCW, and
   wherein said systematic closed loop is free from additional fossil fuel input.

2. The method of claim 1, wherein said refrigerant is Freon.

3. The method of claim 1, wherein the infrastructure of said systematic closed loop includes pumps and fans powered by supplies having voltages not exceeding 480 volts.

4. The method of claim 1, wherein said systematic closed loop further comprises a DCW-in header fluidly coupled between said natural gas heat exchanger and said steam cycle heat exchanger, said DCW-in header configured to route DCW through said steam cycle heat exchanger to a DCW-out header fluidly coupled between said steam cycle heat exchanger and said flue gas heat exchanger.

5. The method of claim 4, wherein said steam cycle heat exchanger comprises a plurality of steam cycle heat exchangers.

6. The method of claim 4, wherein DCW from said DCW-out header is heated by cumulative flue gas heat at said flue gas heat exchanger, said flue gas heat provided by a thermal flue source fluidly coupled to said flue gas heat exchanger.

7. The method of claim 6, wherein DCW in said flue gas heat exchanger is vaporized by said cumulative flue gas heat.

8. The method of claim 6, wherein the temperature of said flue gas heat is increased by a duct burner fluidly coupled between said thermal flue source and said flue gas heat exchanger.

9. The method of claim 6, wherein said systematic closed loop further comprises a natural gas supply fluidly coupled to said natural gas heat exchanger and said thermal flue source, wherein said natural gas supply provides cooling in said natural gas heat exchanger and combustion BTUs to said thermal flue source.

10. The method of claim 1, wherein said DCW saturated steam from said flue gas heat exchanger flows up a vertical distance to said geothermal turbine.

11. The method of claim 10, wherein said DCW saturated steam from said flue gas heat exchanger flows upwards a vertical distance through a de-aerator to said geothermal turbine.

12. The method of claim 11, wherein said de-aerator removes non-condensables from said DCW saturated through an eductor fluidly coupled to said de-aerator.

13. The method of claim 1, wherein said condensed DCW flows down a vertical distance to said hydroelectric unit.

14. The method of claim 1, wherein said systematic closed loop is retrofitted with a pre-existing natural gas combustion turbine.

15. The method of claim 14, wherein:
   said DCW is boiled a first time by the thermal desalination process; and
   said DCW is boiled a second time from the flue gas of said pre-existing natural gas combustion turbine.

* * * * *